United States Patent [19]

Ghori et al.

[11] Patent Number: 5,678,025
[45] Date of Patent: Oct. 14, 1997

[54] CACHE COHERENCY MAINTENANCE OF NON-CACHE SUPPORTING BUSES

[75] Inventors: Amar A. Ghori, El Dorado Hills, Calif.; Dan Gavish, Haifa, Israel

[73] Assignee: Intel Corporation, Santa Clara, Calif.

[21] Appl. No.: 373,892

[22] Filed: Jan. 17, 1995

Related U.S. Application Data

[63] Continuation of Ser. No. 998,938, Dec. 30, 1992, abandoned.

[51] Int. Cl.$^6$ ............................ G06F 12/08; G06F 13/16
[52] U.S. Cl. .................... 395/462; 395/465; 395/466; 395/842; 395/843
[58] Field of Search .......................... 395/465, 466, 395/462, 473, 843, 842

[56] References Cited

U.S. PATENT DOCUMENTS

| | | | |
|---|---|---|---|
| 4,167,782 | 9/1979 | Joyce et al. | 395/468 |
| 4,975,832 | 12/1990 | Saito et al. | 395/843 |
| 5,045,998 | 9/1991 | Begun et al. | 395/307 |
| 5,091,846 | 2/1992 | Sachs et al. | 395/250 |
| 5,091,850 | 2/1992 | Culley | 395/403 |
| 5,210,847 | 5/1993 | Thome et al. | 395/465 |
| 5,287,481 | 2/1994 | Lin | 395/462 |
| 5,297,270 | 3/1994 | Olson | 395/466 |

*Primary Examiner*—Eddie P. Chan
*Assistant Examiner*—Reginald G. Bragdon
*Attorney, Agent, or Firm*—Blakely, Sokoloff, Taylor & Zafman

[57] ABSTRACT

A cache coherency apparatus for computer systems not having a cache supporting bus is described. The cache coherency apparatus monitors the communication on a bus between a CPU and an external device connected to the bus. The cache coherency apparatus monitors the bus in order to determine when the external device is being programmed by the CPU for a memory modification of a main memory also coupled to the bus. Upon determining that the external device is being programmed for a modification of main memory, the cache coherency apparatus generates cache control signals to a cache memory. Using these cache control signals, the cache coherency apparatus causes the contents of the cache memory to be flushed prior to the memory access performed by the external device. In addition, the cache coherency apparatus generates other cache control signals to disable the locations of main memory being modified from being transferred into the cache memory while the memory access by the external device is taking place. Once the memory access being performed by the external device is complete, the cache coherency apparatus generates additional cache control signals to again enable the caching of previously disabled portions of the main memory. In this manner, the coherency of the cache memory may be maintained even though two or more memory access devices (i.e., a CPU and external devices) both modify locations within the main memory.

6 Claims, 7 Drawing Sheets

| I/O ADDRESS | DESCRIPTION |
|---|---|
| 0000h | DMA CHANNEL 0, MEMORY ADDRESS REGISTER |
| 0001h | DMA CHANNEL 0, TRANSFER COUNT REGISTER |
| 0002h | DMA CHANNEL 1, MEMORY ADDRESS REGISTER |
| 0003h | DMA CHANNEL 1, TRANSFER ADDRESS REGISTER |
| 0004h | DMA CHANNEL 2, MEMORY COUNT REGISTER |
| 0005h | DMA CHANNEL 2, TRANSFER COUNT REGISTER |
| 0006h | DMA CHANNEL 3, MEMORY ADDRESS REGISTER |
| 0007h | DMA CHANNEL 3, TRANSFER COUNT REGISTER |
| 0008h | DMA CHANNEL 0-3, STATUS REGISTER |
| 000Bh | DMA CHANNEL 0-3, MODE REGISTER |
| 000Ch | DMA CLEAR BYTE POINTER |
| 000Dh | DMA MASTER CLEAR BYTE |
| 0081h | DMA CHANNEL 2, PAGE TABLE ADDRESS REGISTER |
| 0082h | DMA CHANNEL 3, PAGE TABLE ADDRESS REGISTER |
| 0083h | DMA CHANNEL 1, PAGE TABLE ADDRESS REGISTER |
| 0087h | DMA CHANNEL 0, PAGE TABLE ADDRESS REGISTER |
| 0089h | DMA CHANNEL 6, PAGE TABLE ADDRESS REGISTER |
| 008Ah | DMA CHANNEL 7, PAGE TABLE ADDRESS REGISTER |
| 008Bh | DMA CHANNEL 5, PAGE TABLE ADDRESS REGISTER |
| 008Fh | DMA CHANNEL 4, CASCADE TO CHANNELS 5-7 |
| 00C0h | DMA CHANNEL 0, MEMORY ADDRESS REGISTER |
| 00C2h | DMA CHANNEL 0, TRANSFER COUNT REGISTER |
| 00C4h | DMA CHANNEL 1, MEMORY ADDRESS REGISTER |
| 00C6h | DMA CHANNEL 1, TRANSFER COUNT REGISTER |
| 00C8h | DMA CHANNEL 2, MEMORY ADDRESS REGISTER |
| 00CAh | DMA CHANNEL 2, TRANSFER COUNT REGISTER |
| 00CCh | DMA CHANNEL 3, MEMORY ADDRESS REGISTER |
| 00CEh | DMA CHANNEL 3, TRANSFER COUNT REGISTER |
| 00D0h | DMA CHANNEL 5-7 STATUS REGISTER |
| 00D2h | DMA WRITE REQUEST REGISTER |
| 00D6h | DMA CHANNEL 5-7 MODE REGISTER |
| 00D8h | DMA CLEAR BYTE POINTER |
| 00DAh | DMA MASTER CLEAR BYTE |

Figure 3

| I/O ADDRESS | REGISTER DESCRIPTION |
| --- | --- |
| 0081h | DMA CHANNEL 2, PAGE TABLE ADDRESS REGISTER. 8-BIT REGISTER + 1 BIT CACHEABLE/NONCACHEABLE S/R FLIP-FLOP |
| 0082h | DMA CHANNEL 3, PAGE TABLE ADDRESS REGISTER. 8-BIT REGISTER + 1 BIT CACHEABLE/NONCACHEABLE S/R FLIP-FLOP |
| 0083h | DMA CHANNEL 1, PAGE TABLE ADDRESS REGISTER. 8-BIT REGISTER +1 BIT CACHEABLE/NONCACHEABLE S/R FLIP-FLOP |
| 0087h | DMA CHANNEL 0, PAGE TABLE ADDRESS REGISTER. 8-BIT REGISTER +1 BIT CACHEABLE/NONCACHEABLE S/R FLIP-FLOP |
| 0089h | DMA CHANNEL 6, PAGE TABLE ADDRESS REGISTER. 8-BIT REGISTER +1 BIT CACHEABLE/NONCACHEABLE S/R FLIP-FLOP |
| 008Ah | DMA CHANNEL 7, PAGE TABLE ADDRESS REGISTER. 8-BIT REGISTER +1 BIT CACHEABLE/NONCACHEABLE S/R FLIP-FLOP |
| 008Bh | DMA CHANNEL 5, PAGE TABLE ADDRESS REGISTER. 8-BIT REGISTER +1 BIT CACHEABLE/NONCACHEABLE S/R FLIP-FLOP |
| 008Fh | DMA CHANNEL 4, CASCADE TO CHANNELS 5-7. 8-BIT REGISTER CACHEABLE/NONCACHEABLE S/R FLIP-FLOP |
| 00D2h | DMA WRITE REQUEST REGISTER. 8-BIT |
| 00D4h | 3X8-BIT SOFTWARE WRITEABLE REGISTERS |
| 000Bh | 4X6-BIT MODE REGISTERS: CHANNEL 0-3. SELECTED BY BIT [1:0] OF DATA BUS. |
| 00D0h | 4X6-BIT MODE REGISTERS: CHANNEL 5-7. SELECTED BY BIT [1:0] OF DATA BUS. |
| 0008h | DMA CHANNEL 0-3 STATUS REGISTER |
| 00D8h | DMA CHANNEL 5-7 STATUS REGISTER |
| 00DCh | MASTER CACHEABILITY INDICATOR |

Figure 4

CACHE COHERENCY MAINTENANCE OF NON-CACHE SUPPORTING BUSES

This application is a continuation of application Ser. No. 07/998,938 filed on Dec. 30, 1992, now abandoned.

The following co-pending U.S. patent applications relate to the present application and are assigned to the same assignee as the present application:

1) U.S. patent application Ser. No. 08/228,145, filed Apr. 15, 1994 entitled "CACHE COHERENCY MECHANISM FOR WRITE-BACK CACHES ON NON-WRITE BACK BUSSES" now U.S. Pat. No. 5,555,398;

2) U.S. patent application Ser. No. 08/130,025, filed Sep. 30, 1993 entitled "LOW COST WRITETHROUGH CACHE COHERENCY APPARATUS AND METHOD FOR COMPUTER SYSTEMS WITHOUT A CACHE SUPPORTING BUS," now U.S. Pat. No. 5,551,006; and 3) U.S. patent application Ser. No. 08/088,205, filed Jul. 6, 1993, entitled "CACHE COHERENCY MECHANISM FOR WRITEBACK CACHE ON NON-WRITEBACK BUSSES".

BACKGROUND OF THE INVENTION

1. Field of the Invention

The present invention relates to the field of computer architectures. Specifically, the present invention pertains to computer systems with cache support.

2. Related Art

Microprocessor performance can be greatly enhanced by use of an on-chip cache memory. The cache provides a local high speed memory store for storage of data and instructions used by a central processing unit (CPU) or microprocessor during normal execution of a sequence of instructions. In a conventional computer system, a main memory is also coupled to the CPU via a bus for main storage of program instructions and data. Access to the main memory by the CPU is typically much slower than access to the cache.

An important function of a cache subsystem is the maintenance of cache coherency. The contents of cache memory must be consistent with the corresponding locations in main memory. Cache coherency may be affected if devices other than the CPU attempt to write into main memory. Many methods exist for maintaining cache coherency in conventional computer systems. Once such method is embodied in the cache subsystem of the i486 brand microprocessor manufactured by Intel Corporation. i486 is a registered trademark of Intel Corporation.

The bus in a typical computer system architecture is used to couple the CPU and other devices such as a direct memory access (DMA) controller to main memory through a memory controller. Signals are typically provided on the bus for supporting the cache subsystem and specifically, for supporting the cache coherency logic. These signals are used by the CPU and the memory controller to determine for a particular memory access request whether the requested data may be found in the cache or whether an access to main memory must be initiated. An access to main memory must be initiated if the requested location in main memory is updated by a device other than the CPU; because, the corresponding location in the cache memory is no longer valid. The bus used in systems supporting an i486 microprocessor provide these cache control signals on the bus. It will be apparent to those skilled in the art that systems supporting a different brand of microprocessor still provide cache control signals on the bus.

Although buses, processors, and memory controllers fully supporting cache subsystems are well-known in the art, other computer systems not supporting cache memory are also well known. One well-known microprocessor used in conventional non-cache supporting computer systems is the 386 brand microprocessor manufactured by Intel Corporation. 386 is a registered trademark of Intel Corporation. It will be apparent to those of ordinary skill in the art that other processors not supporting a cache subsystem exist in a prior art. Because these processors do not support a cache subsystem, the bus coupling these processors and other devices to main memory through a memory controller do not support cache control signals. In non-cache supporting systems, each memory access request made by the CPU or other memory access devices cause the memory controller to initiate an access to main memory. These systems, therefore typically operate much more slowly than cache supporting computer systems. Thus, conventional computer systems either fully support a cache subsystem wherein both the processor and the bus support caching or other conventional systems do not support caching wherein neither the processor nor the bus support caching.

In some situations, it is advantageous to implement a hybrid computer system wherein a processor with an integrated cache is used with a non-cache supporting bus. A non-cache supporting bus is one in which the signals required to support a cache are missing. Such a hybrid system could be built, for example, if a 386 brand microprocessor is upgraded to an i486 brand microprocessor thereby gaining the benefit of a faster processor and one capable of executing i486 compatible software. It will be apparent to those skilled in the art that other situations may arise whereby a processor with an integrated cache may advantageously be used with a non-cache supporting bus. In spite of the advantages of a hybrid system configuration, conventional techniques can not support this hybrid configuration. In order to use the cache subsystem on a processor with an integrated cache, cache control signals must be present on the bus to maintain cache coherency. This is because a memory access device, such as a DMA controller or other processor may initiate a memory access that modifies main memory thereby invalidating the cache.

Thus a better means for supporting cache coherency on non-cache supporting buses is needed.

SUMMARY OF THE INVENTION

The present invention is a cache control apparatus for maintaining cache coherency on non-cache supporting buses. The present invention operates in a computer system comprising a bus which includes address, data, and control information as conventionally implemented and well-known in the art. A processor (CPU) is coupled to the bus and a main memory is coupled through a memory controller to the bus. Memory access requests are received by the memory controller via an interface line from the bus. An external device is coupled to the bus via an interface line. An external device represents any device that may be tied to the bus for the purpose of accessing memory through a bus controller (i.e. a memory access device). Such devices include direct memory access (DMA) controllers and other processors or controllers sharing memory with the CPU. These external devices are capable of directly accessing and modifying the main memory.

The CPU accesses main memory via the bus. A snapshot of a portion of the main memory is maintained within a cache memory. Maintaining a correspondence between the content of cache memory and the content of the main memory is called maintaining cache coherency. As long as the CPU is the only device that modifies the contents of main memory, the task of maintaining cache coherency is relatively easy for the CPU and the memory controller to perform. Complications are introduced when a memory access device such as an external device is tied to the bus and allowed to independently modify the contents of main memory. In this case, the CPU can no longer maintain cache coherency.

In the present invention, a coherency maintenance module (CMM) is added to the computer system architecture. Using the circuitry and methods described below, the CMM monitors the communication between the CPU and an external device. The CMM monitors the bus in order to determine when the external device is being programmed by the CPU for a memory modification of main memory. Upon determining that the external device is being programmed for a modification of main memory, the CMM generates cache control signals to the cache memory. Using these cache control signals, the CMM causes the contents of the cache memory to be flushed prior to the memory access performed by the external device. In addition, the CMM generates other cache control signals to disable the locations of main memory being modified from being transferred into the cache memory while the memory access by the external device is taking place. Once the memory access being performed by the external device is complete, the CMM generates additional cache control signals to again enable the caching of previously disabled portions of the main memory. In this manner, the coherency of the cache memory may be maintained even though two or more memory access devices (i.e., a CPU and an external device) both modify locations within the main memory.

It is therefore an object of the present invention to provide a cache control apparatus for maintaining cache coherency on non-cache supporting buses. It is a further object of the present invention to provide a cache snooping apparatus for maintaining cache coherency wherein more than one device may access a main memory. It is a further object of the present invention to provide a cache control apparatus that maintains cache coherency by monitoring communications between a CPU and an external device coupled to a bus.

These and other objects of the present invention will become apparent as presented and described in the following detailed description of the preferred embodiment.

BRIEF DESCRIPTION OF THE DRAWINGS

FIG. 3 illustrates the external device address table of the preferred embodiment.

FIG. 4 illustrates the cacheability map of the preferred embodiment.

DETAILED DESCRIPTION OF THE PREFERRED EMBODIMENT

The present invention is a cache control apparatus and method for maintaining cache coherency on non-cache supporting buses. In the following description, numerous specific details are set forth in order to provide a thorough understanding of the present invention. However, it will be apparent to one of ordinary skill in the art that the use of specific details need not be used to practice the present invention. In other circumstances, well-known structures, circuits, and interfaces have not been shown in detail in order not to unnecessarily obscure the present invention.

Figure 1:
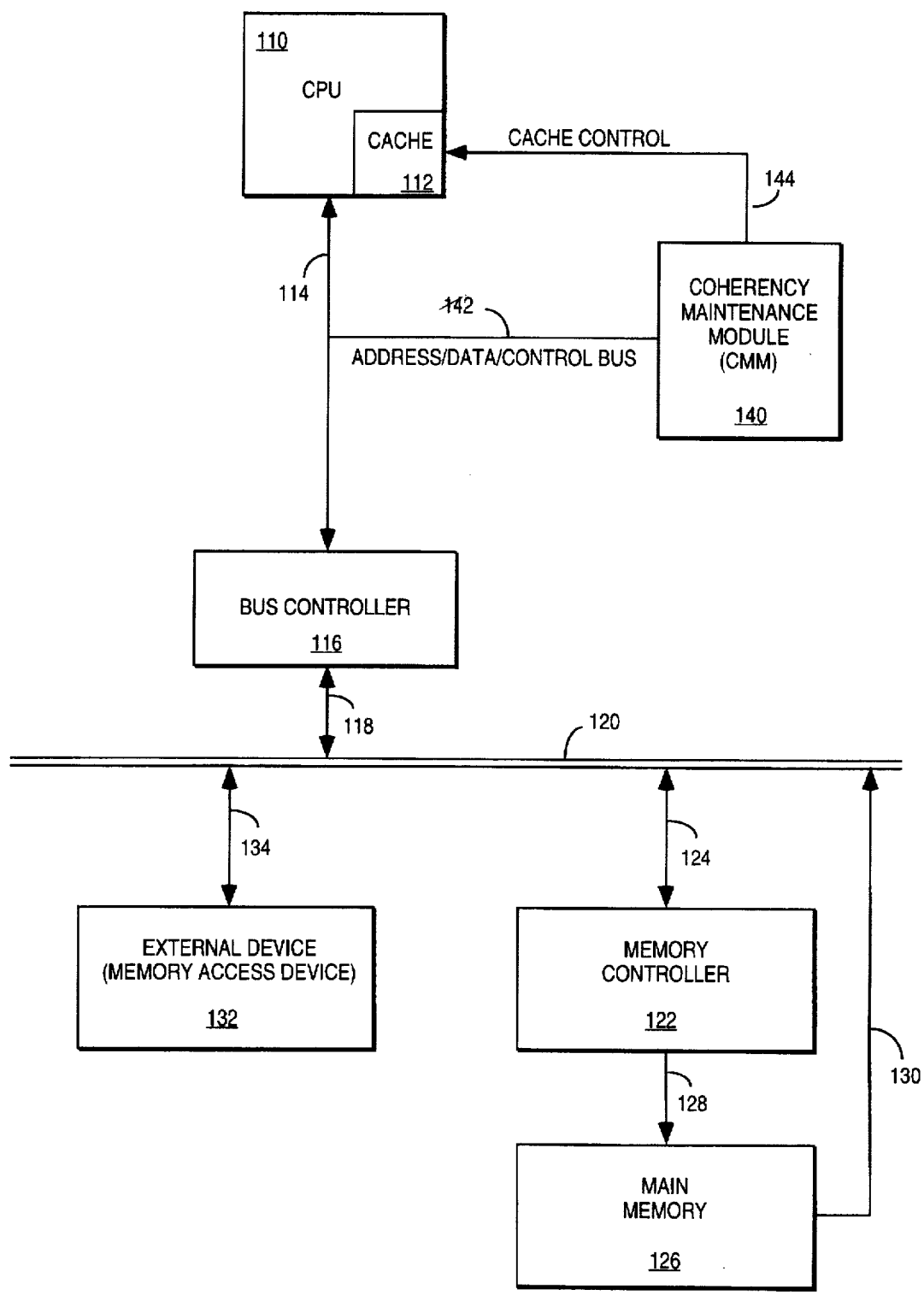
FIG. 1 is a block diagram of the architecture of the computer system in which the present invention operates.

Referring now to FIG. 1, a block diagram of the computer system architecture in which the present invention operates is illustrated. FIG. 1 illustrates a computer system comprising a bus 120 which includes address, data, and control information as conventionally implemented and well-known in the art. In the preferred embodiment, bus 120 is a memory bus used with the 386 brand microprocessor manufactured by the assignee of the present invention. That is, bus 120 does not support cache control signals. A bus controller 116 is tied to bus 120 via interface line 118. Bus controller 116 manages information transfers between bus 120 and CPU 110 to which bus controller 116 is coupled via interface line 114. Bus controller 116 is well-known in the art. CPU 110 is a microprocessor having an on-board cache memory. In the preferred embodiment, an i486 brand microprocessor manufactured by the assignee of the present invention is used. It will be apparent to those of ordinary skill in the art, however, that other processors using cache memory may be implemented with the present invention.

A main memory 126 is also coupled through memory controller 122 to bus 120. Memory access requests are received by memory controller 122 via interface line 124 from bus 120. The addressing and control portion of a memory access request is sent to main memory 126 via interface line 128. The data associated with a memory access request is transferred directly between bus 120 and memory 126 via interface line 130. This configuration of a memory controller and a main memory tied to a bus is well-known to those of ordinary skill in the art.

FIG. 1 also shows external device 132 coupled to bus 120 via interface line 134. External device 132 represents any device that may be tied to the bus for the purpose of accessing memory 126 through memory controller 122 (i.e. a memory access device). Such devices include direct memory access (DMA) controllers and other processors or controllers sharing memory with CPU 110. These external devices are capable of directly accessing and modifying main memory 126.

In the system architecture illustrated in FIG. 1, CPU 110 accesses memory 126 via bus 120. A snapshot of main memory 126 is maintained within cache memory 112. During the normal processing of a series of instructions, CPU 110 generates memory access requests. These memory access requests comprise an address of a location in main memory 126 along with control signals defining whether the memory access is a read or write access or a memory or I/O access. The generation and processing of these types of memory access requests is well-known in the art. Some of the memory access requests generated by CPU 110 may reference locations currently residing within cache memory 112. In this case, a cache hit condition occurs and the memory access requests may be handled more quickly; because, no access across bus 120 to main memory 126 is necessary. The advantages of the use of cache memory 112, however, is only realized if the contents of cache memory 112 corresponds to the contents of main memory 126. Maintaining this correspondence between cache memory 112 and main memory 126 is called maintaining cache coherency. As long as CPU 110 is the only device that modifies the contents of main memory 126, the task of maintaining cache coherency is relatively easy for CPU 110 and memory controller 122 to perform.

Complications are introduced when a memory access device such as external device 132 is tied to bus 120 and allowed to independently modify the contents of main memory 126. In this case, CPU 110 can no longer maintain cache coherency. For example, a memory access request generated by CPU 110 to a particular location would cause the contents of the corresponding location to be fetched from main memory and stored within cache memory 112. Some time later, an external device 132 may generate a memory access request to modify the corresponding location in main memory 126. In a conventional system, CPU 110 would not be aware of the modification of main memory 126 by external device 132. In this case, CPU 110 would be unable to maintain cache coherency.

Figure 2:
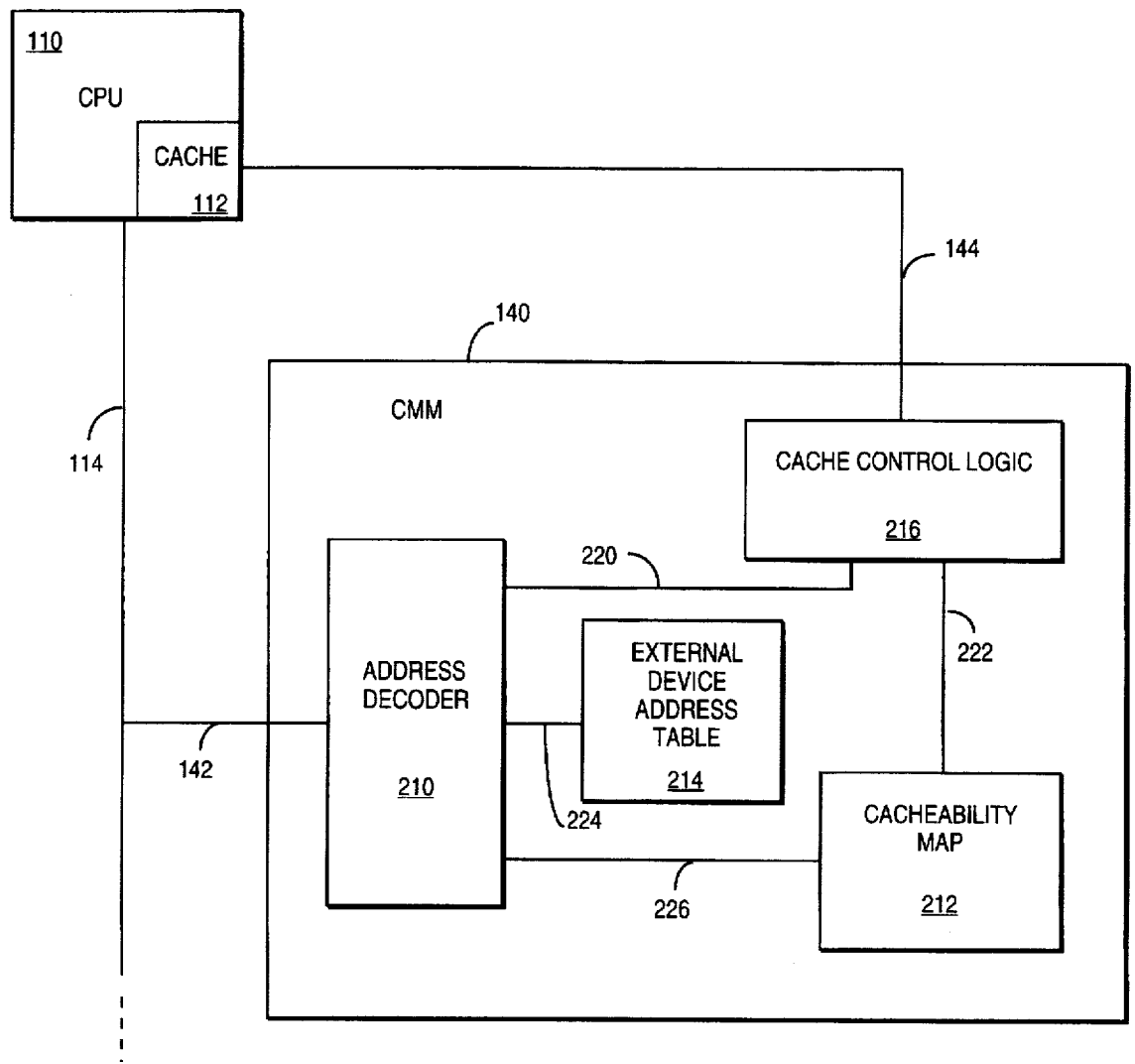
FIG. 2 is a block diagram of the coherency maintenance module of the present invention.

In the present invention, a coherency maintenance module (CMM) 140 is added to the computer system architecture as illustrated in FIG. 1. Using the circuitry and methods described below, CMM 140 monitors the communication between CPU 110 and external device 132 via lines 114, 118, bus 120, and line 134. CMM 140 monitors the bus in order to determine when the external device 132 is being programmed by CPU 110 for a memory modification of main memory 126. Upon determining that external device 132 is being programmed for a modification of main memory 126, CMM 140 generates cache control signals to cache memory 112 via line 144. Using these cache control signals, CMM 140 causes the contents of cache memory 112 to be flushed prior to the memory access performed by external device 132. In addition, CMM 140 generates other cache control signals to disable the locations of main memory 126 being modified from being transferred into cache memory 112 while the memory access by external device 132 is taking place. Once the memory access being performed by external device 132 is complete, CMM 140 generates additional cache control signals to again enable the caching of previously disabled portions of main memory 126. In this manner, the coherency of cache memory 112 may be maintained even though two or more memory access devices (i.e., CPU 110 and external device 132) both modify locations within main memory 126. Referring now to FIG. 2, the internal architecture of CMM 140 is illustrated. As shown, CMM comprises an address decoder 210 coupled to bus 114 via lines 142. Address decoder 210 receives and interprets address, data, and control signals issued by CPU 110 or external device 132. Address decoder 210 is coupled to cache control logic 216 on line 220. Cache control logic 216 comprises circuitry for generating cache control signals on line 144 to CPU 110. It will be apparent to those of ordinary skill in the art that the partitioning of components illustrated in FIG. 2 is a logical partitioning. The functionality described below for cache control logic 216 may alternatively be incorporated into address decoder 210 or the functionality described below for address decoder 210 may alternatively be incorporated into cache control logic 216.

Address decoder 210 interprets address, data, and control signals using external device address table 214 and cacheability map 212. External device address table 214 is coupled to address decoder by line 224. Cacheability map 212 is coupled to address decoder 210 by line 226 and cache control logic 216 by line 222. External device address table 214 comprises a list of addresses corresponding to control/mode and status registers of external device 132. A detailed list of the control/mode and status registers used in the preferred embodiment of the present invention is illustrated in FIG. 3. It will be apparent to those of ordinary skill in the art that other implementations of external device 132 may use a different set of control/mode and status registers. In general, these control/mode and status registers are used by CPU 110 to program external device 132 for an access to main memory 126. CPU 110 accesses these control/mode and status registers of external device 132 by presenting an address of a desired register on line 114. The address thus presented is received by address decoder 210. By comparing the address received by address decoder 210 with the contents of external device address table 214, address decoder 210 may determine if an address presented on line 114 is an access to a control/mode or status register of external device 132. In this manner, address decoder 210 determines when CPU 110 is programming external device 132 for an access to main memory 126. This information is passed to cache control logic 216 where cache control signals for disabling caching of an area of main memory 126 are generated on line 144 to CPU 110.

As illustrated in FIG. 3, the external device 132 of the preferred embodiment supports up to eight different channels of memory accesses to main memory 126. Any one of these channels may be independently programmed by CPU 110. Because addresses for control/mode and status registers associated with each individual channel are maintained within external device address table 214, address decoder 210 can determine on a channel by channel basis when a particular channel of external device 132 is being programmed by CPU 110. In addition, address decoder 210 can monitor the address presented on line 114 to determine if CPU 110 is requesting status from a status register of a particular channel of external device 132. By knowing when CPU 110 is requesting status from external device 132, address decoder 210 can read the status returned by external device 132 from the data lines of lines 142. In this manner, address decoder 210 can determine whether a data transfer previously initiated for a particular channel has been completed as defined by the status returned by external device 132.

Referring to FIG. 3, an address of 0000h (hex) presented on lines 114 corresponds to the memory address register of DMA channel 0. Address 0001h corresponds to the transfer count register of DMA channel 0. The memory address register and the transfer count register are control registers for DMA channel 0 in the preferred embodiment of the present invention. If CPU 110 addresses either of these control registers, address decoder 210 interprets this access as an attempt by CPU 110 to program channel 0 for a memory access to main memory 126. Address 000Bh corresponds to the mode register for DMA channels 0–3. The mode register can be considered an additional control register for channels 0–3. If the mode register is addressed and a write mode for a particular channel is enabled, address decoder 210 interprets such a control register manipulation as the programming of a particular external device 132 channel for a write memory access to main memory 126. Because this access of main memory 126 by external device 132 has the potential of disturbing the coherency of cache memory 112, address decoder 210 and cache control logic 216 respond to the programming of an external device 132 channel in a manner described below in connection with FIGS. 5–7 that ill-usage the logic of the present invention.

Again referring to FIG. 3, address 0008h corresponds to the status register for DMA channels 0–3 in the preferred embodiment. When CPU 110 addresses a status register of external device 132, address decoder 210 may subsequently read the returned status on the data lines as described above. In this manner, address decoder 210 can determine when a previously initiated memory access operation is complete. Address decoder 210 and cache control logic 216 respond to the completion of a memory access operation in a manner described below in connection with FIGS. 5–7.

In the preferred embodiment, external device 132 includes a set of eight page table address registers that hold the address indicating the start of a block or page of memory in main memory 126 corresponding to a particular channel. In addition, a cacheability indicator is maintained for each channel of external device 132. The function of the page table address registers and cacheability indicators are illustrated in FIG. 4 and FIGS. 5–7.

Referring now to FIG. 4, the set of registers comprising cacheability map 212 is illustrated. Cacheability map 212 comprises eight page table address registers and eight cacheability indicators. One page table and one cacheability indicator is maintained for each of eight channels of external device 132 in the preferred embodiment of the present invention. It will be apparent to one of ordinary skill in the art that one or more channels may be supported by the present invention. Each page table address register is used for storing the starting address of a block or page of memory in main memory 126 corresponding to the associated channel of external device 132. Memory accesses for a particular channel are made in the area defined by the corresponding page table address register. In the preferred embodiment, each page table address register is an eight bit register; however, it will apparent to those of ordinary skill in the art that registers of a different width may equivalently be used.

A cacheability indication is also stored in cacheability map 212 for each channel of external device 132. The cacheability indication defines whether the page of memory defined by the corresponding page table address register may be cached in cache memory 112. If the cacheability indicator is set to indicate that the corresponding page is cacheable, the contents of the page of main memory 126 defined by the page table address register may be transferred when appropriate into cache memory 112. If the cacheability indicator is set to indicate a page is non-cacheable, the page of main memory 126 defined by the page table address register is not transferred to cache memory 112 as it normally would be under a conventional caching methodology. The cacheability indicator for each channel is used to disable the caching of a selected page of main memory 126 while external device 132 is in the midst of an access to main memory 126 that may cause the contents of main memory 126 to be modified. A master cacheability indicator is also stored in the cacheability map 212. The master cacheability indicator is used to enable or disable caching in the entire main memory 126. The cacheability indicators stored within cacheability map 212 are used by address decoder 210 and cache control logic 216 during the operation of monitoring addresses on the bus and while generating cache control signals as will be discussed in detail in connection with the processing flow diagrams illustrated in FIGS. 5–7.

Figure 5:
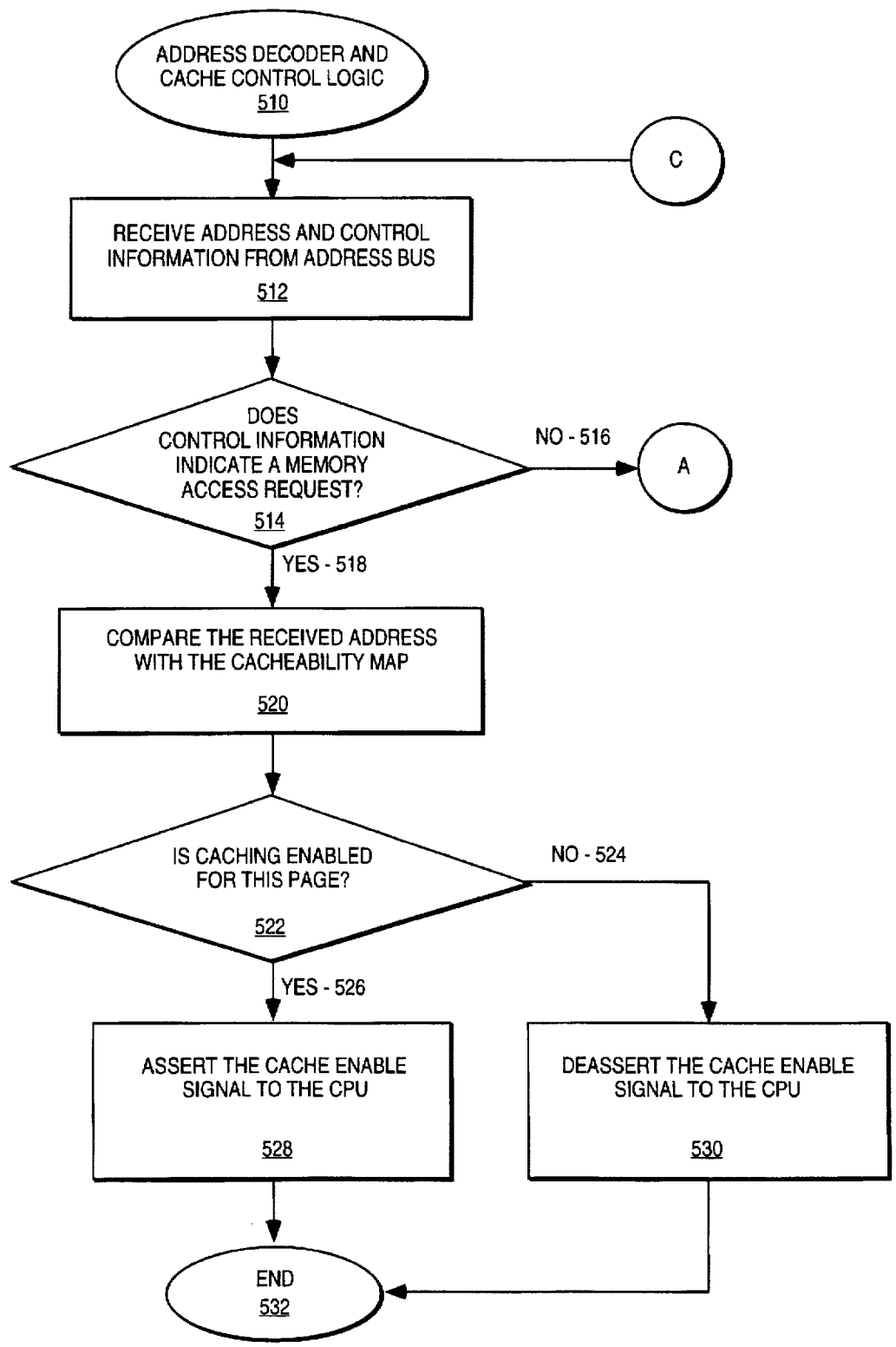
FIGS. 5-7 are flow diagrams illustrating the logic implemented in the cache control logic.

Referring now to FIG. 5, a portion of the logic implemented within address decoder 210 and cache control logic 216 is illustrated. This logic may be implemented as a gate array, custom integrated hardware or microcode embodiment. It will be apparent to one of ordinary skill in the art that the below-described logic may be implemented using conventional techniques. The address decoder 210 receives an address and control information for a bus cycle via bus 142 (processing block 512). If the control information indicates that the address thus presented corresponds to an access request to main memory 126, processing path 518 is taken to processing block 520. If, however, the bus cycle is not a memory access request, processing path 516 is taken to the bubble labelled A as illustrated in FIG. 6.

Referring still to FIG. 5, processing for a memory access request continues at processing block 520. Address decoder 210 compares the received address with the contents of cacheability map 212 in processing block 520. Using the received address, a cacheability indicator for a channel corresponding to the received address may be retrieved. If the retrieved cacheability indicator indicates that caching is enabled for the page corresponding to the received address or if the page is not found in the cacheability table, processing path 526 is taken to processing block 528 where a cache enable control signal is generated to CPU 110 by cache control logic 216 via line 144 (processing block 528). Processing for the memory access request then terminates at bubble 532 illustrated in FIG. 5. If the cacheability indicator for the page corresponding to the received address indicates that caching is disabled for the page, processing path 524 is taken to processing block 530 where a cache disable control signal is generated and sent to CPU 110 by cache control logic 216 via line 144 (processing block 530). Processing for the memory access request then terminates at bubble 532 illustrated in FIG. 5. Alternatively, processing may continue at the bubble labelled C in FIG. 5 where the next bus cycle is monitored.

Figure 6:
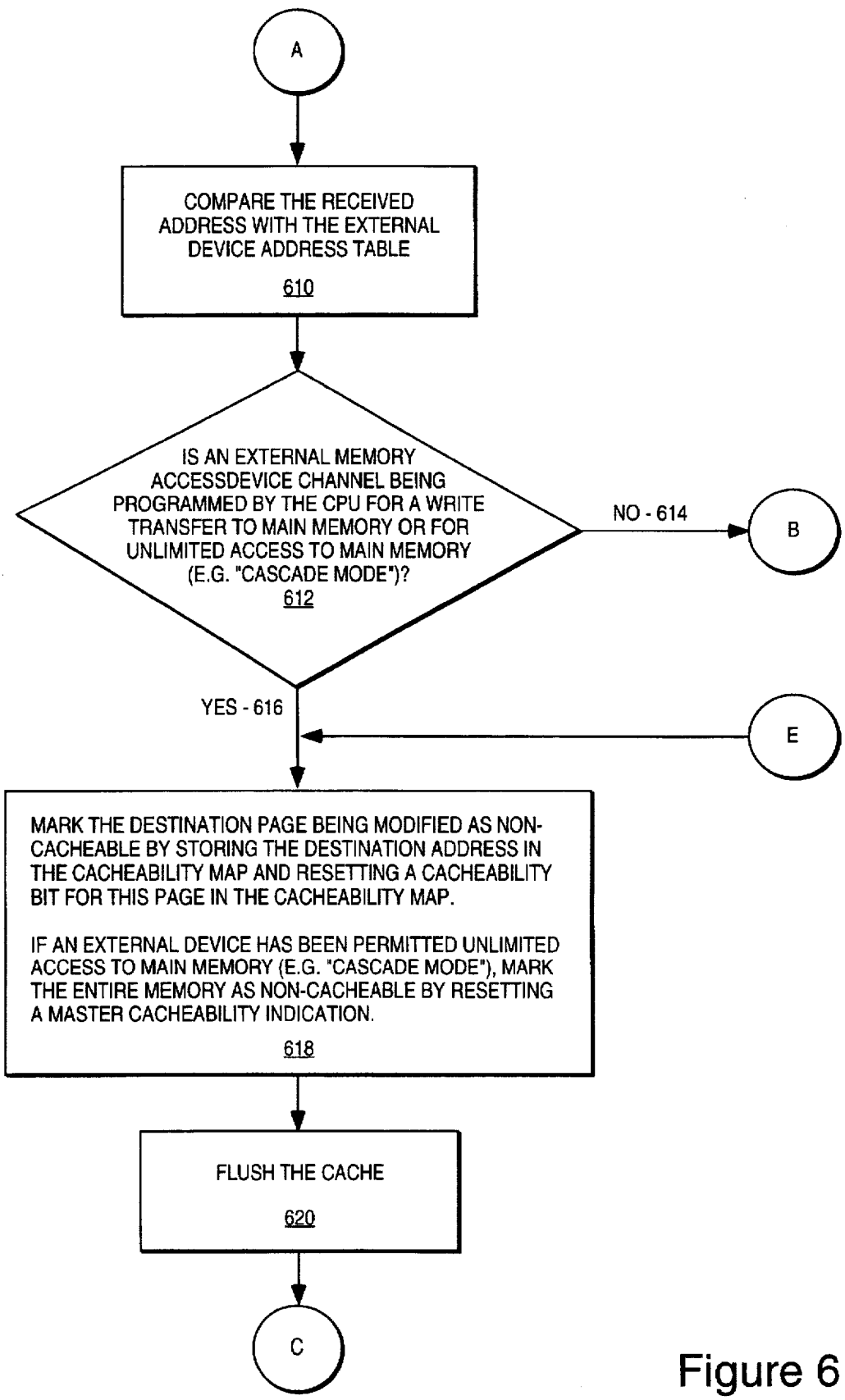

Referring now to FIG. 6, processing for the control logic within address decoder 210 and cache control logic 216 is illustrated starting at the bubble labelled A. Processing block 610 is performed for bus cycles that are not requests for access to main memory 126. These bus cycles are typically input/output (I/O) cycles such as an access by CPU 110 to external device 132. Because such an access might lead to an operation of a device causing cache incoherency, address decoder 210 compares the received address with the contents of external device address table 214 (processing block 610). Using this table, cache control logic 216 can determine if the received address corresponds to the address of a control/mode or status register of external device 132. If a control and mode register of external device 132 is accessed as defined in external device address table 214, address decoder 210 interprets this access as an attempt by CPU 110 to program the external device 132 for a memory access to main memory 126. If a channel of external device 132 is being programmed by CPU 110 for a write transfer to main memory 126, processing path 616 is taken to processing block 618 for marking the page of memory as non-cacheable. Furthermore, if an external memory access device channel is being programmed by the CPU 110 to permit external device 132 or another external device unlimited access to main memory (e.g. a "cascade" mode), processing path 616 is taken to processing block 618 for marking the entire memory as non-cacheable. If, however, external device 132 is not being programmed for a write transfer, processing path 614 is taken to the bubble labelled B as illustrated in FIG. 7.

Referring still to FIG. 6, processing block 618 is executed if CPU 110 has programmed a particular channel of external device 132 for a write transfer to main memory 126. In this case, the destination page (i.e. the page being written) as defined by the page table register corresponding to the channel being programmed is marked as being non-cacheable. The destination page is marked by resetting the cacheability indicator to indicate that the corresponding page is not cacheable. The cacheability indicator for the particular channel is located in the cacheability map 212 as described above (processing block 618). Once the page being modified is marked as non-cacheable, the contents of the marked page can no longer be stored in cache memory 112. In the special case of programming a channel of external device 132 for unlimited access to main memory 126 (e.g. a "cascade" mode), the entire main memory 126 is marked as non-cacheable by resetting a master cacheability indicator as illustrated in FIG. 4. Having marked the page being modified or the entire main memory 126 as non-cacheable, the current contents of the cache are flushed in processing block 620. Cache control logic 216 flushes cache memory 112 by generating a flush cache control signal to CPU 110 on line 144. Because the current contents of cache memory 112 have been flushed and subsequent storage of the contents of the modified page into cache memory 112 have been disabled, cache incoherency problems caused by external devices modifying the contents of main memory 126 are eliminated. Processing for the cache control logic then continues at the bubble labelled C as illustrated in FIG. 5 where the control logic sets up to receive a new address on bus 142 for a subsequent bus cycle.

Figure 7:
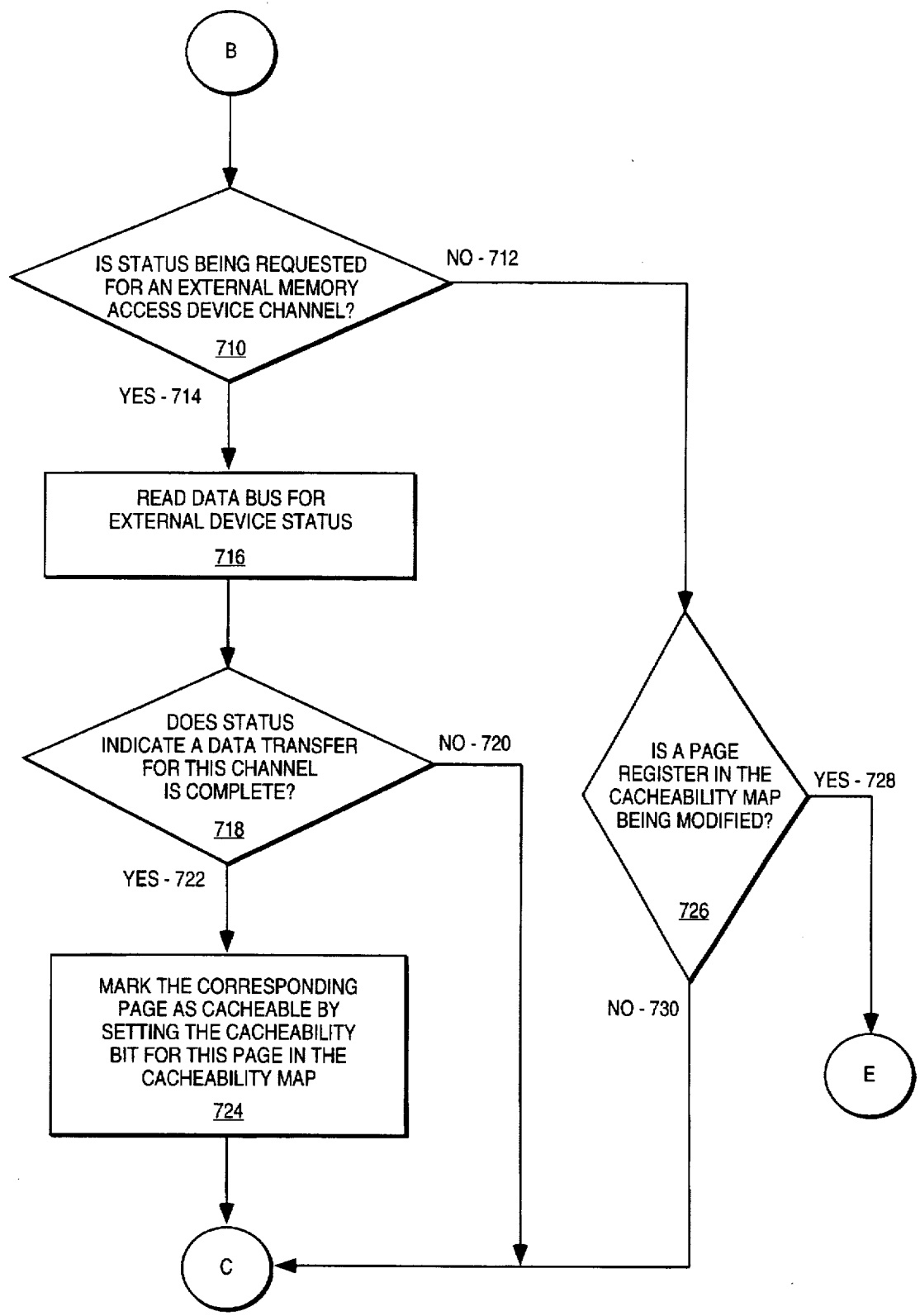

Referring now to FIG. 7, processing performed by address decoder 210 and cache control logic 216 continues at the bubble labelled B. Decision block 710 is performed when a particular bus cycle is neither a memory access request nor an attempt by CPU 110 to program a control or mode register of external device 132. In this case, CPU 110 may be issuing an address of a status register of external device 132 for the purpose of requesting the status of a particular channel of external device 132. Address decoder 210 determines if a status register of external device 132 is being addressed by comparing the received address with the contents of external device address table 214. If the received address corresponds to a status register for a particular channel of external device 132, processing path 714 is taken to processing block 716 illustrated in FIG. 7. In this case, address decoder 210 receives the data signals on bus 142. These data signals will correspond to the contents of the status register addressed by the received address. The contents of the status thus received may be interpreted to determine if a memory access request previously initiated for the corresponding channel has been completed. If this is the case (processing path 722), the corresponding cacheability indicator for the channel for which a memory access request has been completed is set to enable caching of the corresponding page (Processing block 724). Because the access to main memory 126 by external device 132 has been completed, memory access activity on that channel can no longer influence the cacheability of cache memory 112. For this reason, the page corresponding to this channel may be allowed to be transferred into cache memory 112 when appropriate. The performance benefits provided by caching may thereby be enabled.

Referring again to decision block 710 illustrated in FIG. 7, if the received address does not correspond to a status register of external device 132 as defined in external device address table 214, processing path 712 is taken to decision block 726. In this case, the contents of external device address table 214 may be searched to determine if the received address corresponds to the address of a page table address register as defined in external device address table 214. If a page table address register is being modified, processing path 728 is taken to the bubble labelled E illustrated in FIG. 6, where the cacheability indicator corresponding to the modified page table address register is marked as non-cacheable and the cache is flushed. The modification of a page table address register is treated by address decoder 210 and cache control logic 216 in much the same way as the programming of a channel of external device 132 for a memory transfer. If the received address does not correspond to a page table address register, processing path 730 is taken to the bubble labelled C as illustrated in FIG. 5 where address decoder 210 sets up to receive an address presented on the bus during the next bus cycle.

Thus, in this manner, cache incoherency is prevented while an external device is engaged in a modification of a portion of main memory. While a portion of main memory is being modified by an external device, that portion of memory is prevented from being cached into a cache memory. Once the modification of that portion of memory is complete, however, caching of that portion of memory is dynamically and adaptively enabled for subsequent accesses to that portion of memory. It should be noted that the implementation of the present invention does not require the addition or modification of signals existing on the bus. Thus, the present invention may be used in computer systems which contain buses that do not support caching (i.e., buses that do not include signals specifically used for maintaining cache coherency). Thus, computer systems not having a cache supporting bus may nevertheless benefit by use of a cache supporting CPU. With the aid of the present invention, therefore, these computer systems may still maintain cache coherency without a significant modification to the system architecture.

Although the present invention is described herein with reference to a specific embodiment, many modifications and variations therein will readily occur to those skilled in the art. Accordingly, all such variations and modifications are included within the intended scope of the present invention as defined by the following claims.

What is claimed is:

1. A method of generating cache control signals for a dynamically cached memory, comprising the steps of:
   a) receiving address and control information from a bus coupled to a processor, wherein the processor has an integrated memory cache;
   b) comparing the received address with entries of an external device address table, if the control information indicates that a current operation is not a main memory access request, wherein the entries of the external device address table identify at least one external device coupled to the bus;
   c) determining if the external device is being programmed by the processor to modify a main memory;
   d) updating a cacheability map to indicate that all of the main memory is non-cacheable, if the external device is permitted access to modify all of the main memory;
   e) updating the cacheability map to indicate that a specific portion of the main memory is non-cacheable, if the external device is permitted access to modify only the specific portion of main memory; and
   f) providing cache control signals to flush a portion of the integrated memory cache, wherein the flushed portion is associated with the non-cacheable portions of the main memory as determined by the cacheability map.

2. The method of claim 1 wherein step c) further comprises the step of:
   i) comparing the address and control information with the entries of the external device address table to determine if the external device is being programmed for a write access to main memory.

3. The method of claim 1 wherein step c) further comprises the step of:
   i) comparing the address and control information with the entries of the external device address table to determine if the external device is being programmed to have unlimited access to main memory.

4. The method of claim 1 wherein step d) further comprises the steps of:
   i) setting a master cacheability indicator within the cacheability map, wherein a status of the master cacheability indicator determines whether caching is disabled for all of the main memory.

5. The method of claim 1 wherein step e) further comprises the step of:
 i) storing a destination address corresponding to the specific portion of main memory in the cacheability map, if the destination address is not already in the cacheability map; and
 ii) setting a destination address cacheability indicator within the cacheability map to indicate that caching is disabled for the specific portion of main memory.

6. The method of claim 1, wherein step c) further comprises the steps of:

i) reading the bus to obtain the status of a channel of the external device, if the current operation is a status request for a channel of the external device channel, wherein the channel is used to access main memory; and
 ii) updating the cacheability map to indicate that the specific portion of main memory corresponding to the channel is cacheable, if the status indicates that a data transfer for the channel is complete.

* * * * *

UNITED STATES PATENT AND TRADEMARK OFFICE
CERTIFICATE OF CORRECTION

PATENT NO. : 5,678,025
DATED : October 14, 1997
INVENTOR(S) : Ghori et al.

It is certified that error appears in the above-identified patent and that said Letters Patent is hereby corrected as shown below:

In the Title page, item [54] and in Col. 1, line 2, delete "of" and insert --on--.

Signed and Sealed this

Seventeenth Day of March, 1998

Attest:

Attesting Officer

BRUCE LEHMAN

Commissioner of Patents and Trademarks